UNITED STATES PATENT OFFICE.

R. B. FITTS, OF PHILADELPHIA, PENNSYLVANIA.

IMPROVEMENT IN TREATING NIGHT-SOIL FOR AGRICULTURAL PURPOSES.

Specification forming part of Letters Patent No. 39,472, dated August 11, 1863; antedated December 19, 1862.

*To all whom it may concern:*

Be it known that I, R. B. FITTS, of the city of Philadelphia, in the State of Pennsylvania, have invented a new and useful Process for Treating Night-Soil for Agricultural Purposes; and I do hereby declare that the following is a full and exact description of the same.

In treating fresh night-soil from the carts for the purpose of rendering it suitable for transportation and for immediate application as a fertilizer there have been numerous different processes invented; but in all of them the undersigned believes a great loss occurs, either from the escape of dissolved or gasified matters or from the incomplete decomposition of the more solid portions; and to remedy these defects in treating the night-soil is the object of my invention.

It consists, substantially as hereinafter described, first, in prolonging the fermentation of the fresh night-soil in any suitable close vessels connected with a distinct gas-receiving chamber; secondly, in afterward precipitating the fertilizing matters contained in the urine with the solid portions of the night-soil and then running or draining off the supernatant water to waste; thirdly, in absorbing or combining the escaping gases with pulverized sulphate of lime and charcoal intimately mixed together and exposed in a showering manner to the said gases in any suitable close chamber; and, fourthly, in then mixing the latter product with the drained solid contents of the first vessel, together with anhydrous sulphate of lime, and reducing it to a pulverulent condition, for the purpose of producing a fertilizer containing all the valuable constituents of night-soil in a condition ready for immediate application to agricultural purposes in a more perfect and economical manner.

To enable others to understand and practice my process, I will proceed to explain it more fully, and to point out what I believe to be the best mechanical devices for carrying it out successfully.

I allow the decomposition or fermentation of the night-soil to proceed in any suitable close tanks connected by means of suitable pipes with a gas-receiving air-tight tower of any suitable height, in which the gases escaping from the decomposing matter in the tanks may rise and meet with a descending shower of finely-pulverized sulphate of lime and charcoal which have been previously mixed together intimately, so that the said descending materials may absorb or combine with the rising gases, and together be afterward capable of being withdrawn from the bottom of the tower when required; and after the decomposition of the night-soil in the tanks has been allowed to proceed for a sufficient length of time—say about a week—I mix it with sufficient quantities of the solutions of sulphate or muriate of magnesia, sulphate of iron, chloride of sodium, or of such other salts as are well known or used to precipitate the acid, alkaline, and organic substances remaining in solution in the urine for the purpose of precipitating the same, and also perfectly arresting the fermentation, so as to allow all the said precipitates and the other solid contents of the tanks to settle and allow the supernatant water to be afterward run or drained off to waste as exhausted or useless; and finally I mix the remaining contents of the tanks with the contents or deposit found at the bottom of the tower, and also with a sufficient quantity of anhydrous sulphate of lime to absorb the remaining moisture, and thus render the compound pulverizable, and then pass it through any appropriate mill, and barrel, box, or sack it for transportation or use.

It will be readily understood without any further description that the process described provides for a sufficient degree of decomposition in the night-soil to render it the most advantageously available for immediate application to the soil as a fertilizer, and that the valuable constituents held in solution in the urine and the gases which have heretofore generally been allowed to escape in the treatment of night-soil are secured and the whole combined or mixed together into a dry state, constituting a fertilizer of great value to agriculturists.

In regard to the construction of the tower herein referred to, and also in regard to the arrangement of the same in relation to the decomposing-tanks, I would state that it is my intention to hereafter make application for a distinct patent for the same, and therefore do not desire to embrace in the present claim any part of the said mechanical constructions, as the process described for treating night-soil may be carried out by mechanical devices of a different construction and arrangement; but, Having fully set forth my invention, and pointed out its superior utility, what I claim as new, and desire to secure by Letters Patent, is—

The process herein described and specified, for the purposes set forth.

R. B. FITTS.

Witnesses:
 BENJ. MORISON,
 WILLIAM OGLE.